(12) United States Patent
Ginesi et al.

(10) Patent No.: US 7,536,197 B2
(45) Date of Patent: May 19, 2009

(54) APPARATUS AND METHOD OF LOOP AND RATE DEPENDENT POWER CUTBACK

(75) Inventors: Alberto Ginesi, Nepean (CA); Francois Tremblay, Hull (CA); Scott McClennon, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 1517 days.

(21) Appl. No.: 09/919,574

(22) Filed: Jul. 30, 2001

(65) Prior Publication Data
US 2002/0072386 A1 Jun. 13, 2002

(30) Foreign Application Priority Data
Jul. 28, 2000 (CA) .................... 2314665
Jul. 28, 2000 (CA) .................... 2314713

(51) Int. Cl.
H04B 7/00 (2006.01)
H04Q 7/20 (2006.01)

(52) U.S. Cl. .................. 455/522; 455/69; 455/517; 455/126

(58) Field of Classification Search ............. 455/69, 455/522, 572, 574, 67.11, 501, 502, 523, 455/61, 67.13, 72, 63.1, 452.2, 452.1, 561, 455/226.1, 126, 127.1, 517, 127.5, 13.4; 379/93.32, 22.04, 211, 24, 27, 30, 390.04; 370/465, 480, 242, 252, 271
See application file for complete search history.

(56) References Cited

U.S. PATENT DOCUMENTS

| | | | | |
|---|---|---|---|---|
| 5,265,151 A | * | 11/1993 | Goldstein | 379/93.32 |
| 5,768,684 A | | 6/1998 | Grubb et al. | |
| 5,832,387 A | * | 11/1998 | Bae et al. | 455/522 |
| 5,924,015 A | * | 7/1999 | Garrison et al. | 455/13.4 |
| 6,061,427 A | * | 5/2000 | Ryoo | 379/22.04 |
| 6,226,356 B1 | * | 5/2001 | Brown | 379/24 |
| 6,229,855 B1 | | 5/2001 | Takatori et al. | |
| 6,330,462 B1 | * | 12/2001 | Chen | 455/572 |
| 6,370,187 B1 | * | 4/2002 | Agah | 375/219 |
| 6,532,277 B2 | * | 3/2003 | Ulanskas et al. | 379/27.01 |
| 6,539,234 B1 | * | 3/2003 | Hiramatsu et al. | 455/522 |
| 6,542,581 B2 | * | 4/2003 | Suonsivu et al. | 379/1.04 |
| 6,549,520 B1 | * | 4/2003 | Gross et al. | 370/242 |
| 6,549,568 B1 | * | 4/2003 | Bingel | 375/222 |
| 6,647,058 B1 | * | 11/2003 | Bremer et al. | 375/222 |
| 6,690,768 B2 | * | 2/2004 | Hansen | 370/465 |

(Continued)

OTHER PUBLICATIONS

WO98/59426 A (Paradyne Corporation), Dec. 30, 1998, pp. 2-11.

(Continued)

Primary Examiner—John J Lee
(74) Attorney, Agent, or Firm—Merek, Blackmon & Voorhees, LLC

(57) ABSTRACT

Methods for reducing power required for transmitting a signal from a first transceiver to a second transceiver are described. The methods comprise the steps of estimating an excess amount of power used by the first transceiver for transmitting the signal, reducing the first transceiver's power use by the excess amount of power to a reduced power level, and transmitting the signal from the first transceiver using the reduced power level. The reduced power level achieves a transmission rate of the signal within a predefined tolerance of its preferable rate.

31 Claims, 4 Drawing Sheets

U.S. PATENT DOCUMENTS

| | | | |
|---|---|---|---|
| 6,697,487 B1 * | 2/2004 | Getchell | 370/278 |
| 6,865,393 B1 * | 3/2005 | Baum et al. | 455/452.2 |
| 6,879,572 B1 * | 4/2005 | Ayyagari et al. | 455/522 |
| 2001/0031014 A1 * | 10/2001 | Subramanian et al. | 375/260 |
| 2001/0031048 A1 * | 10/2001 | Payne et al. | 379/390.04 |

OTHER PUBLICATIONS

EPO Supplementary European search report dated Oct. 17, 2006, 3 pages.

* cited by examiner

APPARATUS AND METHOD OF LOOP AND RATE DEPENDENT POWER CUTBACK

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates generally to transfer of data using Digital Subscriber Loop (DSL) technology, and specifically to a method for reducing transmitter power used for the transfer.

Remote access and retrieval of data is becoming increasingly popular in data communication. The proliferation of the Internet has provided a vast network of information that is available to the general public. As the Internet grows and technology advances, this information is becoming increasingly voluminous and the details are becoming increasingly intricate. What used to comprise mainly text information has grown to include still and moving images as well as sound. The increase in the volume of information to be transferred has presented a need for a high-speed Internet connection, since traditional telephone modems communicate at speeds too slow for efficient communication.

One proposal for high-speed communication is the introduction of Digital Subscriber Line (DSL) technology. The various DSL technologies include asymmetric DSL (ADSL), high-speed DSL (HDSL), symmetric DSL (SDSL), Symmetric High-Bit-Rate DSL (SHDSL) and Integrated Services Digital Network (ISDN) Basic Rate Interlace (BRI) DSL systems. One of the most attractive features of DSL is that it is implemented using an infrastructure that already exists. DSL shares copper twisted pair lines typically used for telephone communication. However, only a small portion of the available bandwidth of the twisted pair line (0 to 4 kHz) is used for Plain Old Telephone Service (POTS). DSL takes advantage of the available frequency spectrum from 4 kHz to approximately 1.1 MHz for transmitting data.

ADSL is currently the most practical form of DSL technology, and therefore the most widely implemented. ADSL is asymmetric in that its downstream (DS or D/S—to a subscriber) capacity is larger than its upstream (US or U/S—from the subscriber) capacity. An ADSL transceiver unit at a central office or remote loop carrier (ATU-C) is used for sending downstream information and receiving upstream information. An ADSL transceiver unit at a remote location or user end (ATU-R) is used for receiving downstream information and sending upstream information. Typically, a Discrete Multi-tone (DMT) scheme is used. The spectrum from 4 kHz to 1.1 MHz is divided into 256 sub-channels, or tones, each having a bandwidth of 4.3125 kHz. Each sub-channel uses Quadrature Amplitude Modulation (QAM) to carry 2 to 15 bits/QAM symbol.

A predefined power level is used by the ATU-C for transmitting the downstream signal. At the ATU-R, the achievable downstream rate is a function of the received signal level and of the receiver input-referenced noise levels. Where the loop attenuation is modest and the target downstream rate is lower than the achievable rate, the predefined ATU-C transmission level can be much higher than necessary. Therefore, an unnecessary amount of power is consumed by the ATU-C and additional crosstalk noise is induced in adjacent DSL lines. Reducing the ATU-C transmit level would both save power at the ATU-C and reduce crosstalk noise, improving the quality of signal on adjacent lines. From a crosstalk perspective, it is beneficial if the ATU-C transmit power can be reduced during both initialization and steady state (also referred to as "Showtime") operation. If the transmit power and resulting crosstalk is only reduced on entry to Showtime, the higher crosstalk levels during initialization may cause excessive errors and even force re-initialization on adjacent DSL lines.

The benefit of such a power cutback can be significant in Digital Loop Carrier (DLC) applications, for example, where subscriber loops are typically shorter than seen at central office (CO)-resident line interfaces and where power and thermal budgets are tight. Assuming a DMT transmit signal with peak-to-average-ratio (PAR) of 14.5 dB, downstream power cutback can yield significant savings on line driver power alone.

American National Standards Institute (ANSI) and International Telecommunications Union (ITU) compliant ATU-Cs reduce their transmitter power on very short loops to avoid overloading the ATU-R. This reduction in downstream transmission power is often referred to as a "politeness cutback". The politeness cutback is determined in accordance with a loop loss estimate from an upstream signal path and applies on loops shorter than approximately 2-3 kft 26AWG-equivalent. Other downstream transmitter power cutbacks are also specified in the ITU splitterless ADSL standard (G.992.2, which is also known as G.lite) for reducing the downstream signal level to the ATU-R. This cutback is designed to address ADSL signal levels that could cause distortion in the presence of an off-hook telephone set.

However, even with the implementation of the politeness cutback and off-hook cutback, the ATU-C often transmits at a greater power than necessary and there is no agreed-upon mechanism to implement a general downstream power cutback. It is an object of the present invention to obviate or mitigate at least some of the above-mentioned disadvantages.

BRIEF SUMMARY OF THE INVENTION

In accordance with an aspect of the present invention, there is provided a method for reducing power required for transmitting a signal from a first transceiver to a second transceiver. The method comprises the steps of estimating an excess amount of power used by the first transceiver for transmitting the signal, reducing the first transceiver's power use by the excess amount of power to a reduced power level, and transmitting the signal from the first transceiver using the reduced power level. The reduced power level achieves a transmission rate of the signal within a predefined tolerance of its preferable rate.

BRIEF DESCRIPTION OF THE DRAWINGS

Embodiments of the invention will now be described by way of example only with reference to the following drawings in which.

DETAILED DESCRIPTION OF THE INVENTION

ATU-C power requirements can be reduced when there is an excess signal-to-noise ratio (SNR) margin at the ATU-R receiver. It is possible to determine an amount of cutback possible given a target or maximum downstream data rate and a target or maximum downstream SNR margin. The target data rate is the rate at which the ATU-C is to transmit the downstream signal, and the SNR margin is a margin against SNR degradation for a specified bit-error-rate.

Figure 1A:
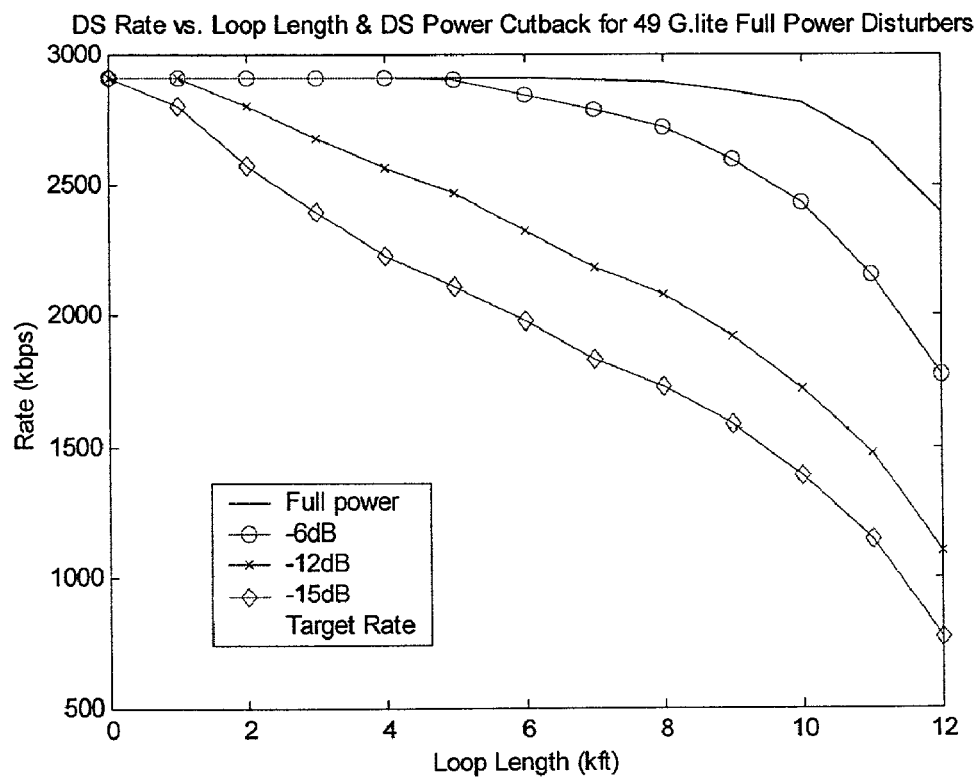
FIG. 1a is a graph illustrating a relationship between transmission rate and loop length for signals transmitted at a plurality of power levels, in the presence of forty-nine G.Lite disturbers.
Figure 1B:
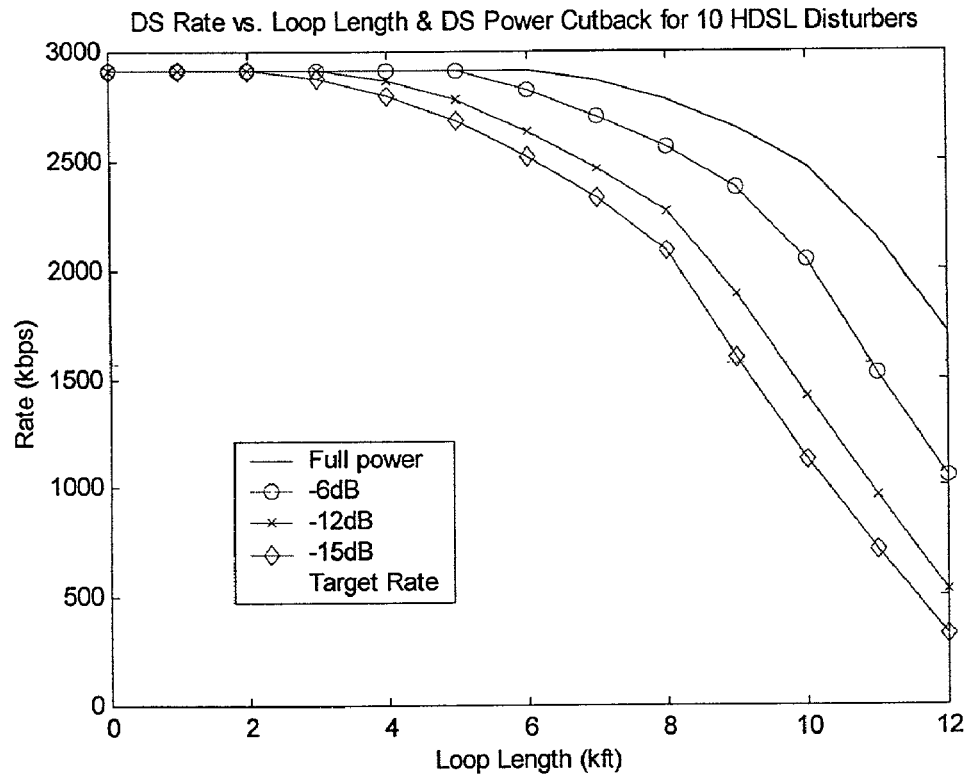
FIG. 1b is a graph illustrating a relationship between transmission rate and loop length for signals transmitted at a plurality of power levels, in the presence of ten HDSL disturbers.
Figure 1C:
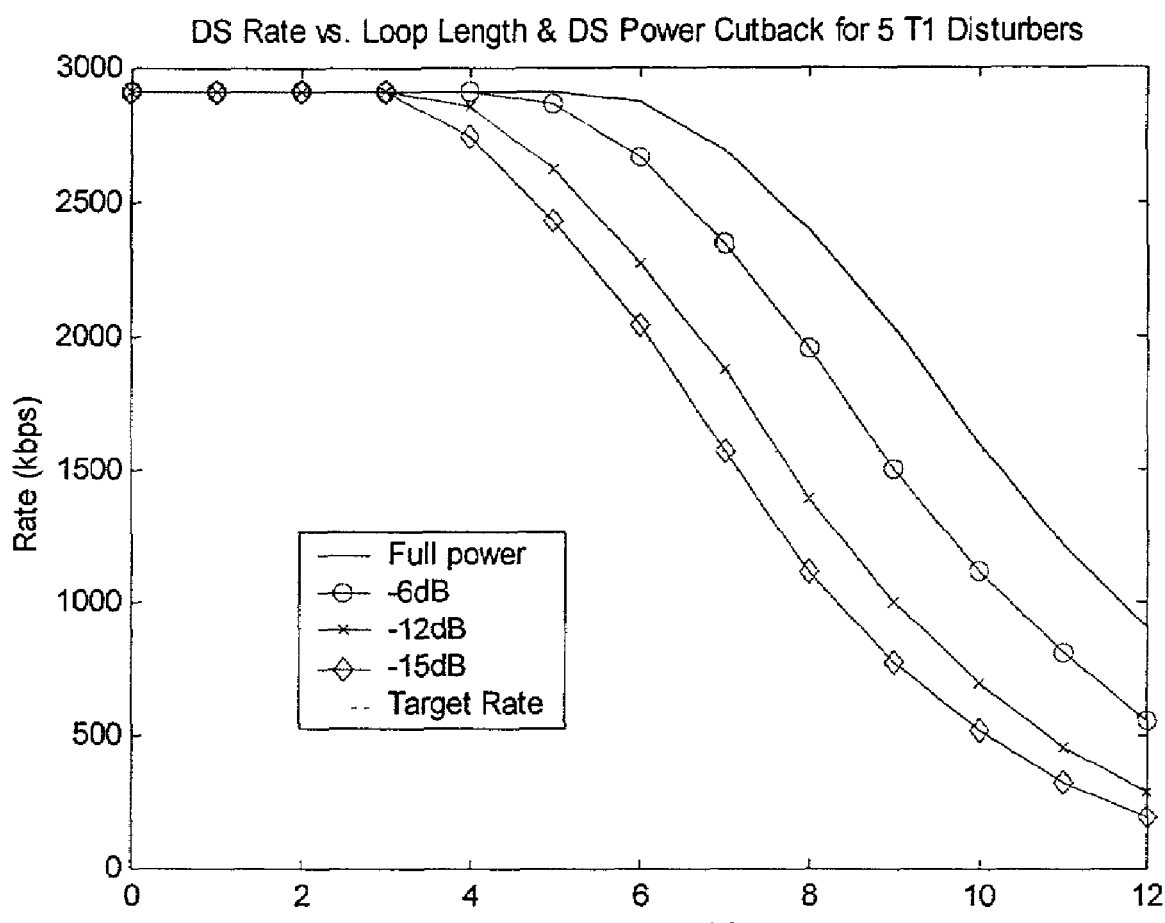
FIG. 1c is a graph illustrating a relationship between transmission rate and loop length for signals transmitted at a plurality of power levels, in the presence of five adjacent binder T1 disturbers.

Referring to FIGS. 1a through 1c, the graphs illustrate attainable downstream rates over loop lengths of 0-12 kft (26AWG). Each graph has a plot illustrating the estimated transmission rates with respect to the loop length with a DS power cutback of 0 dB, 6 dB, 12 dB, and 15 dB in the presence of crosstalk from other DSLs on adjacent pairs. Full-rate ADSL (G.dmt and T1.413) are also illustrated for comparison. The attainable rates have been estimated assuming a 4 dB SNR margin, a 3 dB coding gain, use of downstream carriers 36-127, and a downstream receiver noise floor of −136.8 dBm/Hz. The politeness cutback (of 0 to 12 dB) is not shown in the graphs. However, the politeness cutback is only applied for loop lengths up to approximately 2 kft (26AWG).

Referring to FIG. 1a, the crosstalk scenario is caused by forty-nine (49) other G.lite disturbers. This case is typical of a residential neighborhood, where T1 or HDSL services in the same or adjacent binders is less common. It should be noted that if all local subscribers are being served off power cutback-capable digital loop carriers (DLCs), the G.lite crosstalk levels would actually be lower and the rates would be improved over those shown.

Referring to FIG. 1b, the crosstalk scenario is caused by ten (10) HDSL disturbers. For this case, full capacity (1.5 Mbps) is possible with 15 dB of cutback for loop lengths of up to 9 kft (26AWG), within Carrier Serving Area (CSA) loop engineering rules.

Referring to FIG. 1c, the crosstalk scenario is caused by five (5) adjacent binder T1 disturbers. With T1 disturbers in adjacent binders, full capacity is possible on a loop of length of up to 9 kft with approximately 6 dB of cutback.

In order to implement an appropriate power cutback, it is necessary to either obtain an estimate of the SNR at the receiver or develop a method for determining the amount of signal cutback possible while achieving the target downstream rate and SNR margin. A signal-to-additive-noise estimate (as opposed to signal-dependent-noise estimate, such as mis-equalization error) permits a more accurate estimate of the SNR degradation resulting from a signal level reduction. Once the cutback is determined, it is communicated between the ATU-C and the ATU-R and implemented by the ATU-C.

Estimating the SNR and determining an optimal amount of downstream transmit signal power cutback is most easily accomplished by the ATU-R receiver. Thus far, some proposals have been made in the ITU standards body to permit this and/or require the ATU-R to minimize downstream transmit power via the per-DMT-carrier gains when the maximum downstream SNR margin is exceeded. These methods are not required or supported in the current ADSL standards nor do they address ATU-C transmit (and generated crosstalk) levels during initialization. As a result, it is preferable to have methods for estimating downstream SNR and/or potential cutback in the ATU-C.

The techniques described herein describe a downstream power cutback mechanism that reduces downstream transmit power based on a metric of excess SNR or capacity at the downstream receiver (ATU-R). The following techniques can be implemented with an ATU-R compliant with the current ADSL standards (ITU-T G.992.1, G.992.2 and ANSI T1.413 issue 2).

The amount of downstream transmit power reduction that can be tolerated for a given capacity target is a function of the loop and the crosstalk environment, which together determine the SNR per receiver sub-carrier. Unfortunately, this information is not available to the ATU-C. This information may be inferred from the bits per carrier i ($B_i$s) and gains per carrier i ($G_i$s—also called power per carrier) sent during initialization. Specifically, bits and gains information from the remote-end is transmitted during R-B&G, toward the end of the initialization. However, at this point it is too late to implement a downstream power cutback without impacting the ATU-R, which will at least need to adapt its receiver automatic gain control (AGC).

Therefore, in the absence of explicit information from the ATU-R, several approaches to initialization are disclosed that the potential for power savings without significant capacity losses. For all cases, the amount of cutback versus the measured upstream power can be an operator-specified parameter, as will be appreciated by a person skilled in the art.

Approach A: Reduce Downstream Power Based on Measured Upstream Power Alone

Downstream power cutback based on received upstream power at the ATU-C is already part of the current standards for the politeness cutback. The politeness cutback is used on very short loops, approximately 0 to 2 kft 26AWG equivalent, so there is no impact on downstream capacity regardless of the crosstalk noise environment at the ATU-R. The politeness cutback is performed to minimize the peak signal handling requirements of the ATU-R receiver on short loops. Since it is invoked on only very short loops, it has no impact on power consumption for a typical loop of length 6-8 kft.

Referring to FIGS. 1a-1c, it is possible to cutback the downstream power for loops longer than 2 kft 26AWG-equivalent and maintain an acceptable transmission rate. However, the degree to which the power is cutback depends on one's willingness to risk a failure during full initialization. For example, a cutback of 12 dB is employed where the loop length is estimated to be less than 9 kft 26AWG-equivalent. Assuming that the loop length and equivalent downstream loop losses are adequately estimated from the upstream power measured at the ATU-C and there are no adjacent binder T1 disturbers, the 12 dB cutback will not significantly reduce the DS capacity below approximately 1.5 Mbps.

Unexpected capacity losses may still occur if the ATU-R is not capable of meeting standard test cases because of a noisy front end or amplitude modulation (AM) ingress noise. In those cases, the cutback should be reduced or eliminated and a second full initialization triggered.

Referring to TABLE 1 below, a downstream power cutback is determined as a function of an estimated average of upstream loop attenuation. The estimated average loop attenuation provides an estimate of the loop length. The upstream loop attenuation is defined as the difference between the upstream reference power measured in dBm and the total upstream power measured by the ATU-C on subcarriers 7-18 during stage R-REVERB1 of the initialization. The upstream reference power is defined as the total power used by the ATU-R for transmitting subcarriers 7-18 using the R-REVERB1 transmit power spectral density (PSD) level.

The line rate capacity estimate, less forward error correction (FEC) overhead, in bits per symbol period with no cutback is given by $$C = \sum_i b_i; \; b_i = \text{round}\left(\log_2\left(1 + \frac{SNR_i}{\Gamma}\right)\right) \text{ and } 2 \leq b_i \leq b_{max} \quad (1)$$

where $b_{max}$ is the maximum number of bits/carrier supported in the ATU-R receiver, and

TABLE 1

| Average U/S loop attenuation (dB) | >15 | >14 | >13 | >12 | >11 | >10 | >9 | >8 | >7 | >6 | >5 | >4 | >3 | >2 | >1 | >0 |
|---|---|---|---|---|---|---|---|---|---|---|---|---|---|---|---|---|
| D/S Power cut back (dB) | 0 | 1 | 2 | 3 | 4 | 5 | 6 | 6 | 7 | 8 | 8 | 9 | 10 | 11 | 12 | 12 |

TABLE 1 has been constructed to minimize achievable downstream rate loss with a 6 dB SNR margin in the presence of 24 HDSL or 24 DSL near-end crosstalk (NEXT) sources. A person skilled in the art will appreciate that it is also possible to provide different cutback tables based on operator-provisioned parameters. These parameters include a maximum downstream rate and SNR margin. Generally, the cutback is more aggressive when the downstream rate and/or SNR margin are reduced, and less aggressive when they are increased.

The operator can also be given the capability of overriding this mechanism via an additional Operations, Administration and Maintenance (OAM) parameter.

It is preferable that the maximum amount of cutback is kept to 12 dB as some implementations may have problems in applying higher cutbacks in the analog domain. A cutback applied in the digital domain results in higher requirements for the dynamic range of a digital-to-analog converter (DAC) in the transmitter.

In order to implement the above in accordance with the current ADSL standards, the ATU-C adjusts its transmit power once the downstream power cutback has been determined. This is achieved early enough (before transmission of C-REVERB) such that the ATU-R can adjust its AGC without triggering a new initialization. Note that this mechanism is similar to the existing politeness cutback but is more aggressive in reducing downstream transmit levels. This cutback is motivated by power savings, unlike the politeness cutback (which attempts to avoid overloading an ATU-R receiver on very short loops).

Approach B: Two Passes Through Full-initialization During initial Install or When On-hook Loop Conditions Change Significantly In an alternate embodiment, the ATU-C forces a second full initialization once it has received the $B_i$s, $G_i$s, performance (SNR) margin, and attainable rate from the ATU-R near the end of the first initialization procedure. A per-carrier SNR (linear scale) at the ATU-R is estimated as $10^{(3*Bi+Gi+margin)/20}$, where i is the carrier number, $B_i$ is the number of bits on carrier i, $G_i$ is the gain of carrier i in dB, and margin is the SNR margin reported by the ATU-R (in dB). The ATU-C uses the downstream SNR to perform a downstream rate (capacity) estimate and determines how much of a cutback can be tolerated for the target downstream rate and margin.

$$\Gamma = 10^{(9.8+10-3)/10}$$

is the SNR gap for a bit-error-rate of $10^{-7}$ with 10 dB margin and 3 dB coding gain, for G.992.2.

The maximum cutback is determined such that the capacity with that cutback, C', is greater than or equal to 0.98×C, where $$C' = \sum_i b'_i; \; b'_i = \text{round}\left(\log_2\left(1 + \frac{SNR_i / \text{cutback}}{\Gamma}\right)\right) \text{ and} \quad (2)$$

$$2 \leq b'_i \leq b_{max}$$

The cutback is determined in linear form, corresponding to a multiple of 2 dB.

The initialization procedure is then repeated with the ATU-C transmitting at a power level including the cutback throughout the initialization procedure.

It should be noted that the ATU-R $B_i$s, $G_i$s, and performance margin are based on measurements in C-MEDLEY that include both additive noise (e.g., crosstalk) and signal-level-dependent noise, particularly mis-equalization error. The ATU-C has no direct information on the relative contribution of these two noise or error types. If mis-equalization error is the dominant limitation of SNR, then downstream transmit levels could be reduced more aggressively than the case where additive (signal-level-independent) noise is dominant.

This process also requires approximately twice as long (up to about 20 seconds) to initialize the link, but only needs to be invoked whenever a change has occurred in the noise environment at the ATU-R, for example, when a HDSL service is newly deployed. Such a change in environment may be detected as a degradation in performance during Showtime, including a reduction in the noise margin, an increase in detected CRC errors, and the like. Alternately, an environment change may be detected on a failed power cutback initialization following a period when the communication link is powered down.

Approach C: Reduce DS Power by Excess Margin Reported by ATU-R

In another embodiment, negotiation of transmission rates for the communication link occurs over a series of handshakes between the ATU-C and the ATU-R. The ATU-C begins by providing the ATU-R with a list of four (4) rate options to be met. In another alternate embodiment, the ATU-C further transmits the required SNR margin to be met. The ATU-R responds to those options indicating the highest rate, if any, that can be supported. It also provides the ATU-C with the average downstream loop attenuation and the SNR margin at that rate. The values should be approximately the same for all carriers if the $G_i$s have been calculated to equalize the SNR margin across all carriers. If the ATU-R is able to support the highest transmission rate, with a SNR margin in excess of the desired margin, then a power reduction in the amount of the difference between the desired SNR margin and actual SNR margin can be realized. The difficulty with this approach is that the ATU-R is not necessarily designed to adapt to a signal level change at this point in the initialization, forcing a new full initialization.

Approach D: Over-specify Margin in First Round of Rate Negotiations

In yet another alternate embodiment, during the first round of rate negotiations, the ATU-C specifies a SNR margin comprising a minimum SNR margin and an additional 'N' dB of SNR margin. If the ATU-R responds (in R-MSG-RA) that it can support a high link rate at the inflated SNR margin, the ATU-C drops its transmitter power by 'N' dB and sets the required margin lower by an equivalent amount for the second round of rate negotiations. If, however, the ATU-R cannot support the target transmission rate with the inflated margin, the ATU-C does not cutback its transmit power, but still reduces the minimum required SNR margin (by 'N') for the second round of negotiations. As with the previous embodiment, the difficulty with this approach is that the ATU-R is not necessarily designed to adapt to a signal level change at this point in the initialization, forcing a new full initialization More optimal techniques than those described above in Approaches A-D require changes to the existing standards. The changes allow for a faster initialization and maximize the achievable cutback. These techniques are set forth in Approaches E-F below.

Approach E: ATU-R Signals Attainable Cutback Implicitly in Downstream $G_i$s Based on SNR Measured in C-MEDLEY In yet another alternate embodiment the ATU-R can indicate a power cutback implicitly by reducing the $G_i$s to be used on each of the downstream carriers where there is excess SNR margin, based on SNR measurements made during C-MEDLEY. If so, this sets the downstream power cutback desired. With the current ADSL standards, one cannot assume that a vendor's ATU-R will specify the $G_i$s in this manner. That is, the ATU-R may use the $G_i$s only to equalize the margin on each carrier, while keeping an overall unnecessarily large SNR margin. The $G_i$s are communicated to the ATU-C late in the initialization process. As a result, any change in transmit gain must be exact as there is no time for the ATU-R to adapt its receiver to an imprecise gain change before the start of Showtime. Practically, this causes the signal to be reduced in the digital domain, before the digital-to-analog converter (DAC), and can place excess demands on the DAC's dynamic range. This method has the disadvantage of not applying the cutback until the $G_i$'s are implemented on entry to Showtime. As a result, the transmit level, and resulting crosstalk into adjacent lines, remains high through initialization.

As described in Approach B above, the SNR measured by the ATU-R in C-MEDLEY includes both signal-level-dependent and signal-level-independent noise at the ATU-R.

Approach F: ATU-R Signals Attainable Cutback implicitly in Downstream $G_i$s Based on a Signal-level-independent SNR or Noise/Error Signal Estimate In yet another alternate embodiment, the ATU-R determines the amount of downstream power cutback that can be tolerated while meeting the target downstream rate and SNR margin. In order to determine the SNR impact of a reduced downstream transmit signal where mis-equalization error may be dominant, the ATU-R requires several parameters. These parameters include an estimate of the receiver noise floor over the downstream frequency band in the absence of the downstream signal, an estimate of the channel attenuation in the downstream band, and knowledge of the provisioned downstream rates and margins (i.e., maximums and targets). The ATU-R calculates the achievable downstream cutback from this information and communicates the cutback back to the ATU-C, which implements the cutback in time for the ATU-R to re-adjust its receiver AGC prior to the SNR estimation during C-MEDLEY. A sample method for estimating the above-described parameters is described as follows.

The ATU-R measures the received downstream power (during C-REVERB 1) and estimates the average loop attenuation, as per the current standards, across carriers 7-18 based on a measured per-carrier received signal level and known per-carrier transmit signal levels in C-REVERB 1. C-REVERB 1 may be sent with a politeness cutback. The ATU-R is informed of the extent of the cutback via a message from the ATU-C. C-REVERB 1 may also be replaced by another standard-specific line probing signal that permits extrapolation of the channel attenuation over the downstream frequency band but has different spectral characteristics than those for C-REVERB 1.

The ATU-R measures the received downstream noise level during C-QUIET. A minimum noise floor measurement resolution capability may be specified to ensure that the ATU-R is capable of supporting a specific downstream power cutback for a given downstream loop loss and crosstalk noise environment. Any receiver AGC should be set to a value sufficient to resolve the noise level at the loop interface. However, it should not be set so high as to ignore noise contributions from its own front end. The receiver may need to budget for those noise sources if they become dominant at low AGC gain settings.

The ATU-C communicates the maximum, target and minimum downstream transmission rates and SNR margins to the ATU-R. This can be achieved, for example, during C-MSG1 in the current standard.

The ATU-R calculates the amount of downstream cutback possible without reducing estimated downstream capacity below the provisioned maximum downstream rate at the provisioned maximum margin. The capacity calculations are based on a received signal (transmit signal less channel attenuation) and receiver input referenced noise levels as measured at each upstream carrier frequency and mapped to an equivalent per-carrier SNR, SNRi. Note that this capacity formulation is based on the measured signal and noise levels, independent of near end echo, timing jitter or mis-equalization effects. An additional 6 dB of margin is included in the SNR gap figure used in the capacity calculation to cover these impairments, measurement tolerances, and for providing a hedge against introduction of more NEXT sources into the same binder group. The line rate capacity estimates are calculated using equations 1 and 2 as previously described.

The ATU-R communicates the required cutback to the ATU-C, for example in a field of R-MSGS1. Allowing for a power cutback range of 0-15 dB in 1 dB steps, a 4-bit message field is required.

After receiving and decoding the message from the ATU-R, the ATU-C applies the power cutback approximately 500-3500 symbols into C-MEDLEY. The ATU-R is able to adapt its receiver gain to the new ATU-C transmit level over this interval prior to its final SNR estimation during C-MEDLEY.

Figure 2A:
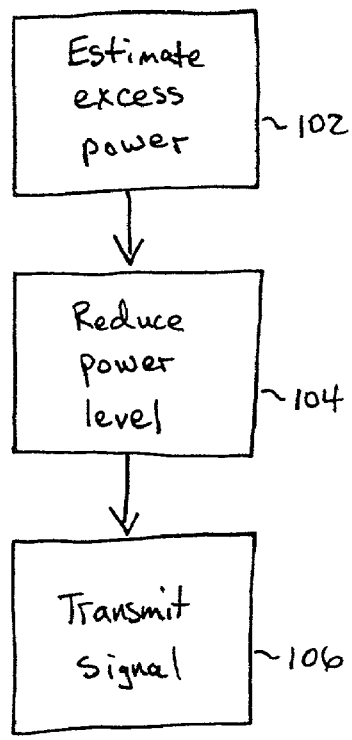
FIGS. 2a and 2b are flowcharts of the process steps according to embodiments of the present invention.
Figure 2B:
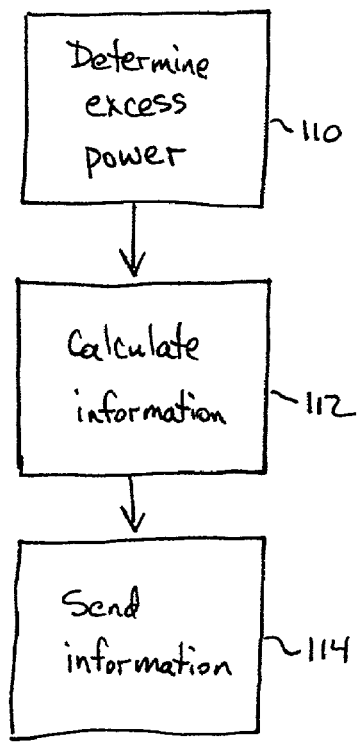

FIGS. 2a and 2b are flowcharts generally illustrating the process steps detailed above in Approaches A-F. In FIG. 2a, in step 102 the ATU-C estimates an excess amount of power used for transmitting the downstream signal. The ATU-C may use Approaches A-D to estimate the excess amount of power, as appropriate for each particular implementation. In step 104, the ATU-C reduces the power level of its transmitted (downstream) signal. In step 106, the ATU-C transmits the downstream signal at the reduced power level. The reduced power level achieves a transmission rate of the downstream signal within a predefined tolerance of its target rate.

In FIG. 2b, in step 110 the ATU-R determines an amount of excess power in the downstream signal transmitted from the ATU-C. In step 112, the ATU-R calculates an attainable reduced power level for the downstream signal. In step 114, the ATU-R communicates the reduced power level information to the ATU-C. The ATU-C has enough time to adjust its power level without requiring a second initialization. The ATU-R may use any one or more of Approaches E-F to determine the amount of excess power, calculate the attainable reduced power level, or communicating the reduced power level information, as appropriate.

Figure 3:
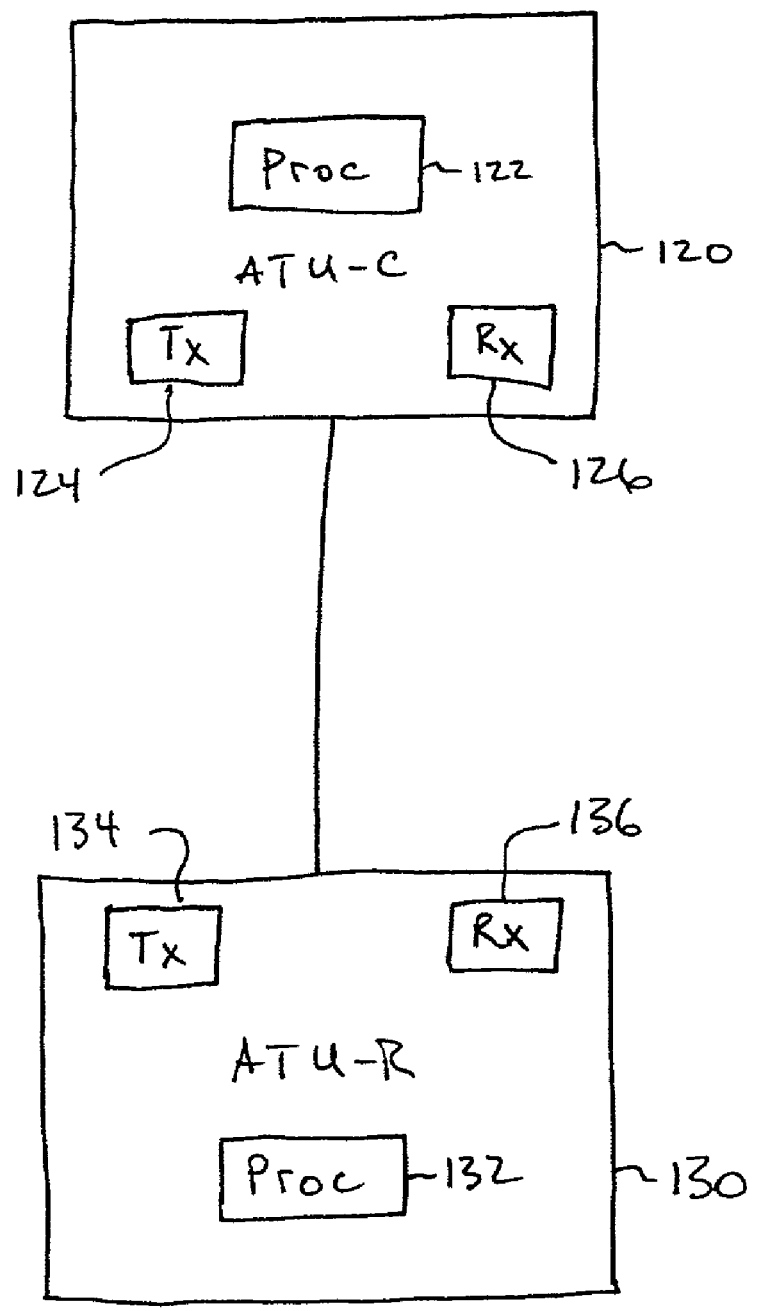
FIG. 3 is a block diagram of an ATU-C and an ATU-R that implement embodiments of the present invention.

FIG. 3 is a block diagram of an ATU-C 120 and ATU-R 130 that implement the processes of FIGS. 2a and 2b (as well as Approaches A-F), as appropriate.

The ATU-C 120 includes a processor 122 that controls the ATU-C to implement the above-identified processes. The ATU-R 130 includes a processor 132 that controls the ATU-R to implement the above-identified processes. The processors 122 and 132 may be implemented as specific hardware (such as an application-specific integrated circuit or field-programmable gate array) or as general hardware (such as that would implement a computer program or microcode). The ATU-C 120 includes a downstream transmitter 124 and an upstream receiver 126. The ATU-R 130 includes an upstream transmitter 134 and a downstream receiver 136.

Although the invention has been described with reference to certain specific embodiments, various modifications thereof will be apparent to those skilled in the art without departing from the spirit and scope of the invention as outlined in the claims appended hereto.

What is claimed is:

1. A method of reducing power required for transmitting a signal from a first transceiver to a second transceiver, comprising the acts of:
   estimating at said first transceiver an excess amount of power used by said first transceiver for transmitting said signal, wherein said excess amount of power for said signal is based at least in part on a value obtained during initialization;
   reducing a power use of said first transceiver by said excess amount of power to a reduced power level; and
   transmitting said signal from said first transceiver using said reduced power level, wherein said reduced power level achieves a transmission rate of said signal within a predefined tolerance of a target rate thereof.

2. The method of claim 1, wherein said first transceiver is located at one of a central office and a remote loop carrier, and comprises a downstream transmitter and an upstream receiver, and wherein said second transceiver is located at an end user location and comprises an upstream transmitter and a downstream receiver.

3. The method of claim 2, wherein said excess amount of power for said signal is estimated in accordance with a measured value of upstream attenuation.

4. The method of claim 3, wherein said measured value of upstream attenuation is calculated as a difference between a total transmit power transmitted from said upstream transmitter and a measured power of an upstream signal received at said upstream receiver.

5. The method of claim 4, wherein a value of said excess amount of power of said signal is associated with a value of said upstream attenuation in a table.

6. The method of claim 2, wherein said first transceiver estimates a per carrier signal-to-noise ratio (SNR) in accordance with bit-per-carrier, power-per-carrier, and SNR margin information received from said second transceiver.

7. The method of claim 6, wherein said first transceiver uses said bit per carrier information for estimating a rate of said signal and a rate of said signal transmitted at a selected reduced power level, for ensuring said transmission rate is maintained within said predefined tolerance.

8. The method of claim 7, wherein a second initialization is required for transmitting said signal at said reduced power level.

9. The method of claim 2, wherein said first transceiver reduces said power in accordance with an excess SNR provided by said second transceiver.

10. The method of claim 9, wherein a second initialization is required for transmitting said signal at said reduced power level.

11. The method of claim 2, wherein said excess amount of power is estimated by estimating an excess amount of SNR at said second transceiver for said target rate.

12. The method of claim 2, wherein said first transceiver provides said second transceiver with a minimum SNR inflated by a value N corresponding to said excess amount of power, and wherein said first transceiver transmits at a power level reduced by said value N if said second transceiver is capable of supporting said minimum SNR inflated by said value N.

13. The method of claim 1, wherein said transmitting step recited in claim 1 is performed during initialization at a time before transmission of C-REVERB.

14. A method of reducing power required for transmitting a signal from a first transceiver to a second transceiver, comprising the steps of:
   determining at said second transceiver an amount of excess power in said signal transmitted from said first transceiver;
   calculating at said second transceiver an attainable reduced power level for said transmitted signal; and
   communicating said reduced power level between said second and first transceivers, wherein said first transceiver adjusts its power level during a first initialization and prior to a time period that would require a second initialization.

15. The method of claim 14, wherein said second transceiver indicates a power cutback implicitly by reducing power-per-carrier information communicated to said first transceiver.

16. The method of claim 14, wherein said first transceiver adjusts its power level before transmission of C-REVERB.

17. An apparatus for reducing power required for transmitting a signal from a central office asymmetric digital subscriber line (ADSL) termination unit (ATU-C) to a remote ADSL termination unit (ATU-R), wherein said ATU-C includes a processor for controlling said ATU-C to implement processing including the acts of:
   estimating an excess amount of power used by said ATU-C for transmitting said signal, wherein said excess amount of power for said signal is based at least in part on a value obtained during initialization;

reducing a power use of said ATU-C by said excess amount of power to a reduced power level; and transmitting said signal from said ATU-C using said reduced power level, wherein said reduced power level achieves a transmission rate of said signal within a predefined tolerance of a target rate thereof.

18. The apparatus of claim 17, wherein said excess amount of power for said signal is estimated in accordance with a measured value of upstream attenuation.

19. The apparatus of claim 18, wherein said measured value of upstream attenuation is calculated as a difference between a total transmit power transmitted from said ATU-C and a measured power of an upstream signal received at said ATU-C.

20. The apparatus of claim 19, wherein a value of said excess amount of power of said signal is associated with a value of said upstream attenuation in a table.

21. The apparatus of claim 17, wherein said ATU-C estimates a per carrier signal-to-noise ratio (SNR) in accordance with bit-per-carrier, power-per-carrier, and SNR margin information received from said ATU-R.

22. The apparatus of claim 21, wherein said ATU-C uses said bit per carrier information for estimating a rate of said signal and a rate of said signal transmitted at a selected reduced power level, for ensuring said transmission rate is maintained within said predefined tolerance.

23. The apparatus of claim 22, wherein a second initialization is required for transmitting said signal at said reduced power level.

24. The apparatus of claim 17, wherein said ATU-C reduces said power in accordance with an excess SNR provided by said ATU-R.

25. The apparatus of claim 24, wherein a second initialization is required for transmitting said signal at said reduced power level.

26. The apparatus of claim 17, wherein said excess amount of power is estimated by estimating an excess amount of SNR at said ATU-R for said target rate.

27. The apparatus of claim 17, wherein said ATU-C provides said ATU-R with a minimum SNR inflated by a value N corresponding to said excess amount of power, and wherein said ATU-C transmits at a power level reduced by said value N if said ATU-R is capable of supporting said minimum SNR inflated by said value N.

28. An apparatus for reducing power required for transmitting a signal from a central office asymmetric digital subscriber line (ADSL) termination unit (ATU-C) to a remote ADSL termination unit (ATU-R), wherein said ATU-R includes a processor for controlling said ATU-R to implement processing including the acts of:

determining an amount of excess power in said signal transmitted from said ATU-C;

calculating an attainable reduced power level for said transmitted signal; and communicating said reduced power level to said ATU-C, wherein said ATU-C adjusts its power level during a first initialization and prior to a time period that would require a second initialization.

29. The apparatus of claim 28, wherein said ATU-R indicates a power cutback implicitly by reducing power-per-carrier information communicated to said ATU-C.

30. The apparatus of claim 28, wherein said ATU-C adjusts its power level during initialization at a time before transmission of C-REVERB.

31. A method of reducing power required for transmitting a signal from a first transceiver to a second transceiver, comprising the acts of:

estimating an excess amount of power used by said first transceiver for transmitting said signal, wherein said excess amount of power for said signal is estimated in accordance with a measured value of upstream attenuation;

reducing a power use of said first transceiver by said excess amount of power to a reduced power level; and transmitting said signal from said first transceiver using said reduced power level, wherein said reduced power level achieves a transmission rate of said signal within a predefined tolerance of a target rate thereof.

* * * * *